(12) United States Patent
Bhattacharyya et al.

(10) Patent No.: US 11,337,155 B2
(45) Date of Patent: May 17, 2022

(54) EVENT-DRIVEN POLICY BASED MANAGEMENT OF WIRELESS BEACON AND TAG DEVICES

(71) Applicant: Cisco Technology, Inc., San Jose, CA (US)

(72) Inventors: Abhishek Bhattacharyya, Fremont, CA (US); Jagdish Girimaji, Pleasanton, CA (US); Anand Oswal, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 89 days.

(21) Appl. No.: 16/299,811

(22) Filed: Mar. 12, 2019

(65) Prior Publication Data
US 2020/0296671 A1 Sep. 17, 2020

(51) Int. Cl.
H04W 52/02 (2009.01)
H04W 4/80 (2018.01)
H04W 40/24 (2009.01)
H04W 80/02 (2009.01)
H04W 4/50 (2018.01)
H04W 12/37 (2021.01)
H04W 4/38 (2018.01)

(52) U.S. Cl.
CPC ......... *H04W 52/0261* (2013.01); *H04W 4/80* (2018.02); *H04W 40/244* (2013.01); *H04W 80/02* (2013.01)

(58) Field of Classification Search
CPC ... H04W 52/0261; H04W 80/02; H04W 4/80; H04W 40/244; H04W 4/50; H04W 12/37; H04W 4/38; Y02D 30/70
See application file for complete search history.

(56) References Cited

U.S. PATENT DOCUMENTS

| | | | |
|---|---|---|---|
| 9,258,713 B2 | 2/2016 | Rangarajan et al. | |
| 9,686,241 B1* | 6/2017 | Levin | G06F 21/10 |
| 10,158,545 B1* | 12/2018 | Marrone | H04L 12/66 |
| 10,488,910 B1* | 11/2019 | Cannell | H04W 4/029 |
| 10,560,309 B1* | 2/2020 | Chitalia | H04L 41/069 |
| 2004/0252837 A1* | 12/2004 | Harvey | H04L 63/1441 380/270 |
| 2006/0009213 A1* | 1/2006 | Sturniolo | H04W 8/02 455/426.1 |

(Continued)

OTHER PUBLICATIONS

Hewlett Packard Enterprise Development LP, "Aruba Beacons Validated Reference Design", Oct. 2015, 35 pages.

(Continued)

*Primary Examiner* — Harry H Kim

(74) *Attorney, Agent, or Firm* — Edell, Shapiro & Finnan, LLC

(57) ABSTRACT

A method includes generating, at a server, an event policy for controlling one or more wireless beacon devices in a network; detecting an event in the network; determining whether the event matches the event policy; when the event matches the event policy, generating programming information for configuring the one or more wireless beacon devices; and forwarding the programming information via one or more wireless access points to the one or more wireless beacon devices for configuring the one or more wireless beacon devices based on the programming information.

20 Claims, 9 Drawing Sheets

(56) References Cited

U.S. PATENT DOCUMENTS

| | | |
|---|---|---|
| 2009/0265754 A1 | 10/2009 | Hinds |
| 2009/0325566 A1 | 12/2009 | Bell et al. |
| 2010/0036779 A1* | 2/2010 | Sadeh-Koniecpol ... H04L 63/20 706/11 |
| 2011/0211511 A1* | 9/2011 | Bakthavathsalu ............... H04W 52/0254 370/311 |
| 2013/0052990 A1 | 2/2013 | Zhang |
| 2013/0263296 A1* | 10/2013 | Pomper ............... C12Q 1/6886 800/10 |
| 2015/0072663 A1 | 3/2015 | Chande et al. |
| 2015/0188949 A1* | 7/2015 | Mahaffey ............. H04W 12/37 726/1 |
| 2017/0194807 A1* | 7/2017 | Zeine ..................... H02J 50/40 |
| 2017/0208091 A1 | 7/2017 | Whitsell et al. |
| 2017/0237747 A1* | 8/2017 | Quinn .................. G06F 21/602 726/29 |
| 2017/0344703 A1* | 11/2017 | Ansari .................. H04M 15/41 |
| 2018/0020021 A1* | 1/2018 | Gilmore ............. H04L 63/1441 |
| 2018/0267759 A1* | 9/2018 | Llewelyn ................ G06F 1/163 |
| 2018/0285166 A1* | 10/2018 | Roy ........................ G06F 12/08 |
| 2018/0287902 A1* | 10/2018 | Chitalia ............. G06F 11/3452 |
| 2019/0182749 A1* | 6/2019 | Breaux .................. H04W 4/80 |
| 2020/0137563 A1* | 4/2020 | Bhattacharyya ...... H04L 63/062 |

OTHER PUBLICATIONS

Amit Levy et al., "Beetle: Flexible Communication for Bluetooth Low Energy", MobiSys'16, Jun. 25-30, 2016, Singapore, 12 pages.

\* cited by examiner

450

452 — OBTAINING A FIRST KEY AND A FIRST MAC ADDRESS OF A FIRST WIRELESS BEACON DEVICE OF THE ONE OR MORE WIRELESS BEACON DEVICES

454 — OBTAINING A CONNECTION REQUEST FROM A SECOND WIRELESS BEACON DEVICE OF THE ONE OR MORE WIRELESS BEACON DEVICES FROM ONE WIRELESS ACCESS POINT, THE CONNECTION REQUEST INCLUDING A SECOND MAC ADDRESS OF THE SECOND WIRELESS BEACON DEVICE

456 — SECOND MAC ADDRESS MATCHES FIRST MAC ADDRESS ?

NO → 458 DENYING CONNECTIONS

YES ↓

460 — USING THE FIRST KEY TO GENERATE A RESPONSE FOR ESTABLISHING A SECURED CONNECTION WITH THE SECOND WIRELESS BEACON DEVICE

FIG.4B

EVENT-DRIVEN POLICY BASED MANAGEMENT OF WIRELESS BEACON AND TAG DEVICES

TECHNICAL FIELD

The present disclosure relates to management of wireless beacon and tag devices.

BACKGROUND

Wireless beacons or tags may be battery powered Bluetooth® Low Energy (BLE) devices deployed as an overlay infrastructure that broadcast certain encrypted or unencrypted payloads over the air. The payloads can include telemetry data indicating the state of some sensor attached to the beacon device or certain advertisement packets, which indicate the presence of the beacon and its specific purpose to nearby devices.

The wireless beacons and tags broadcast advertising data in a certain format (e.g., iBeacon™, Eddystone™, and AltBeacon) or broadcast sensor readings such as temperature, humidity, Global Positioning System (GPS) location, oxygen pump levels, heart rates etc., usually in clear text for consuming devices in proximity to receive. The advertisement payload usually has certain structure that assigns meaning to the advertisement. For example, an iBeacon advertisement format has a universally unique identifier (UUID) field, a major field, and a minor field. If the beacon is used in a retail environment, the UUID field generally indicates to which organization the beacon belongs, the major field indicates in which store the beacon is used, and the minor field indicates which specific section in the store the beacon is being used. Interpreting the meaning of the advertisement is performed by nearby devices, usually a digital signage or an application on a consumer's mobile phone consuming the advertisement.

BRIEF DESCRIPTION OF THE DRAWINGS

FIG. 4B is a flow chart depicting a method performed by a management server to establish a secured connection with one or more wireless beacon devices, according to an example embodiment.

DESCRIPTION OF EXAMPLE EMBODIMENTS

Overview

Figure 1:
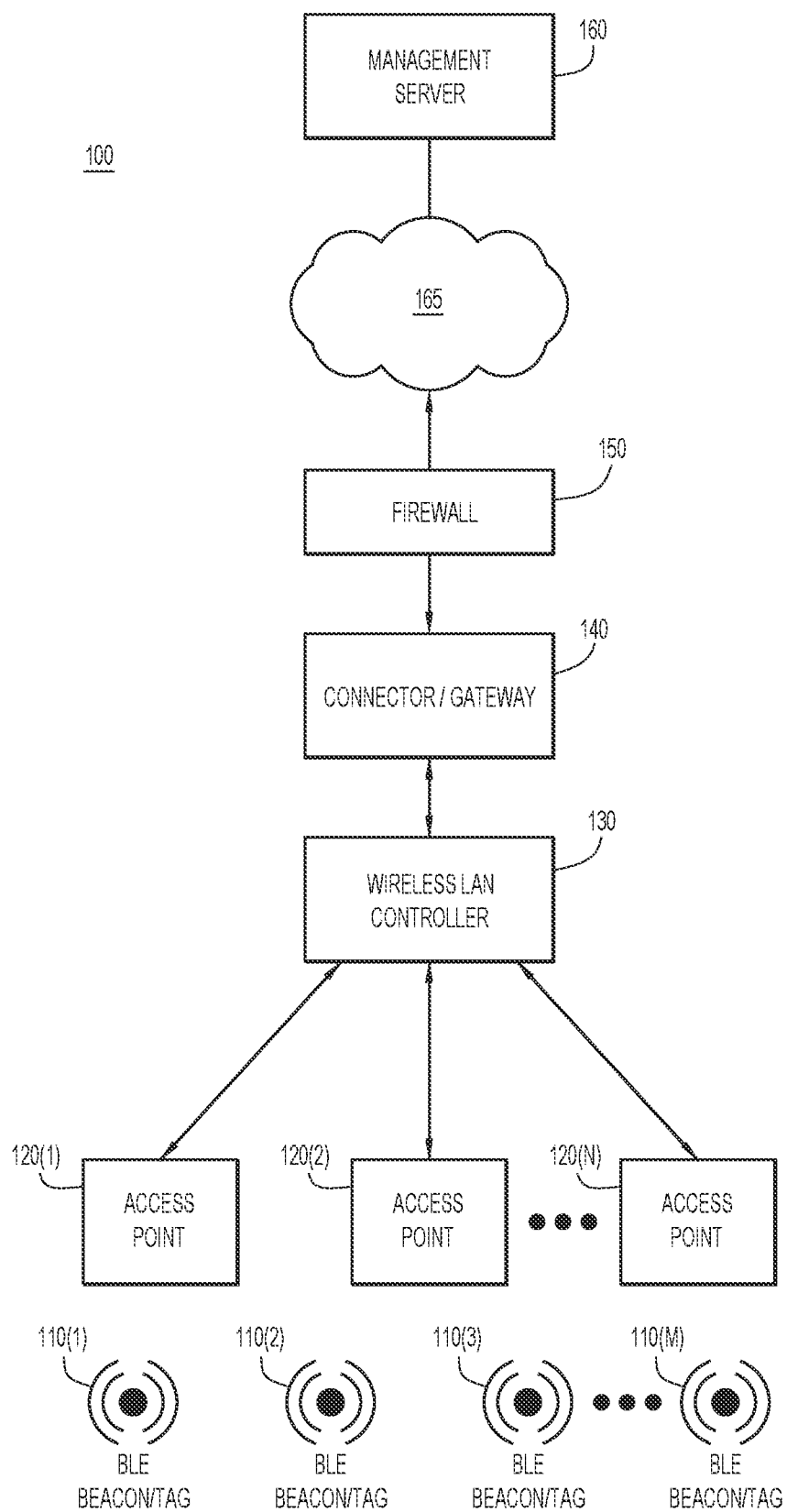
FIG. 1 depicts a communication system in which techniques for dynamically configuring one or more wireless beacon devices are employed, according to an example embodiment.

Techniques are provided herein for configuring wireless beacon/tag devices based on event policies. A server obtains an event policy for controlling one or more wireless beacon devices in a network. When detecting an event in the network, the server determines whether the event matches the event policy. When the event matches the event policy, the server generates programming information for configuring the one or more wireless beacon devices, and forwards the programming information via one or more wireless access points to the one or more wireless beacon devices for configuring the one or more wireless beacon devices based on the programming information.

Example Embodiments

Provisioning beacons used as an overlay infrastructure involves a store administrator to program/configure each beacon individually using a mobile application (app) with appropriate advertisement values. Subsequently, a store operator places the programmed beacons in the correct section of the store (the deployment area). Currently, no mechanism is available for preventing a person from picking up a wireless beacon meant to be in one section and relocating it in another section in a retail store, or preventing a store operator from mistakenly placing a wireless beacon meant to be in one section in a different section. As a result, the digital signage or the mobile app on the customer's device would display an incorrect advertisement due to the misplaced wireless beacon. One way to prevent such improper placement of wireless beacons is through continuous manual surveillance. A store operator would need to manually stand beside each wireless beacon and verify, using a mobile app on the phone, if the wireless beacon is transmitting correct data.

Because of issues with large scale maintenance, beacon firmware is rarely updated, leaving security holes in the overlay communication infrastructure. Moreover, if a beacon runs out of battery power, advertisements from the beacon are often hampered and cannot be implemented properly. As a result, such overlay beacon deployments are not scalable and are time and resource burdensome to maintain over a long term.

Techniques are disclosed herein for dynamically configuring wireless beacon or tag devices based on policies. These techniques provide a way to scale and implement policies to configure beacons or tags in overlay networks based on user intent rather than configuring individual wireless beacon devices. The techniques also provide means to define and extend the overlay network lifetime and ensure improved, uninterrupted overlay network performance. Also, the techniques can adjust and tune overlay network configuration policies for beacons or tags based on externally observed parameters that affect overlay network lifetime and performance. The solutions presented herein address security vulnerabilities, thus reducing the threat surface in an overlay network. The techniques reduce the burden of maintaining an overlay beacon or tag network. In some embodiments, the techniques can flag unexpected behaviors by beacons or tags in an overlay network, and can encrypt beacon or tag telemetry or advertisement broadcasts which can include sensitive data, thereby adding an additional layer of security. Further, the techniques can detect policy violations and flag potential rogue beacons.

Example embodiments will be explained with reference to the accompanying figures. Reference is first made to FIG. 1. FIG. 1 shows a system 100 that includes a plurality of wireless beacon devices (denoted BLE beacon/tag) 110(1)-110(M), a plurality of wireless local area network (WLAN) access points (APs) 120(1)-120(N), a wireless LAN controller 130, a connector/gateway apparatus 140, a firewall 150 and a management server 160 that has connectivity to the connector/gateway 140 via a wide area network (e.g., Internet) 165 and the firewall 150. The APs 120(1)-120(N) are capable of WLAN communication, such as Wi-Fi® communication as well as wirelessly communicating with the wireless beacon devices 110(1)-110(M) using an appropriate protocol, such as the Bluetooth® wireless communication protocol, and in particular the Bluetooth Low Energy (BLE) protocol.

The management server 160 manages operation of the beacon devices 110(1)-110(M) by sending commands/controls through the WLAN controller 130 and APs 120(1)-120(N). In accordance with embodiments presented herein, methods are presented herein to dynamically configure the wireless beacon devices 110(1)-110(M) based on one or more event policies that are generated based on multiple factors, such as device capabilities, network requirements, or user intent for using the wireless beacon devices 110(1)-110(M).

When a beacon device is manufactured, the beacon manufacturer programs a key (henceforth referred to as a connection key) into the beacon device. This key, called a pre-shared key identifier (PSK-ID/BLE) is unique per beacon device. The beacon manufacturer/vendor then informs the management server/service 160 (e.g., through a secure Representational State Transfer (REST) endpoint) about the particular connection key that has been programmed into a particular beacon device in association with a corresponding media access control (MAC) address of the beacon device. It is to be understood that there is another secure connection between the vendor and the management server/service 160, and REST is only one example.

Thus, both the beacon device 110(1)-110(M) and the management server 160 have a pre-shared key for a given beacon device. Using this pre-shared key and an established authentication protocol used in the Bluetooth standard, called LE Secure, the management server 160 establishes a secure connection with a wireless beacon device. Once this secure connection is established, techniques presented herein configure one or more of the wireless beacon devices 110(1)-110(M) based on an event policy.

In the sequence diagrams described hereinafter, the flow of messages through the WLAN controller 130 is omitted only for simplicity. It is to be understood that many or all messages from the APs 120(1)-120(N) flow through the WLAN controller 130 in order to reach the management server 160.

Figure 2:
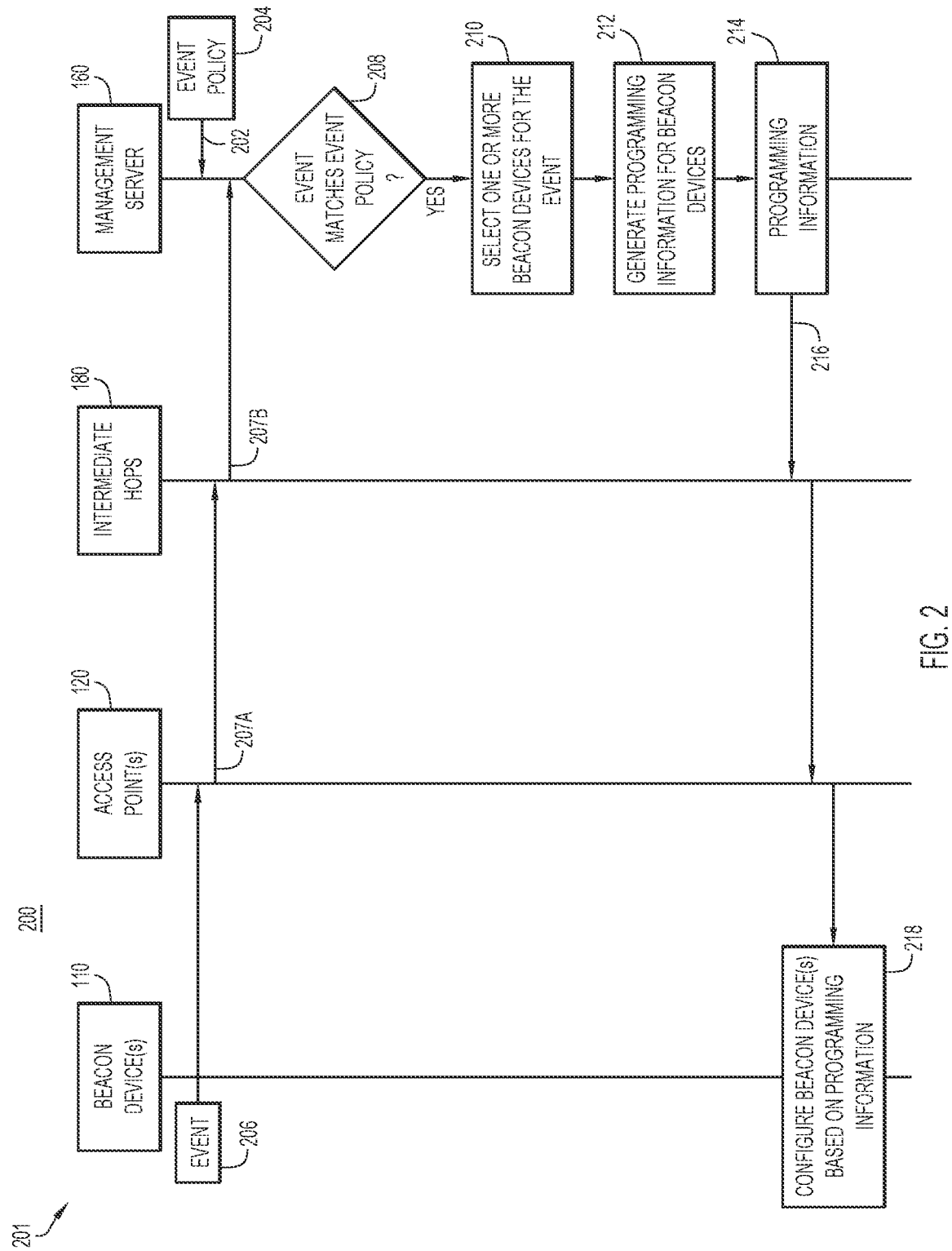
FIG. 2 shows a sequence diagram of a process for dynamically configuring one or more wireless beacon devices based on an event policy in a network, according to an example embodiment.

Reference is now made to FIG. 2 with continued reference to FIG. 1. FIG. 2 shows a sequence diagram of a process 200 for dynamically configuring one or more wireless beacon devices based on an event policy in a network 201, according to one example embodiment. The process 200 shown in FIG. 2 includes, as an example, messages through one or more beacon devices 110, one or more APs 120, various intermediate hop devices denoted by reference numeral 180, and the management server 160. At 202, the management server 160 obtains an event policy 204 for controlling one or more wireless beacon devices 110 in the network 201. The event policy 204 may be generated by the management server 160 or supplied by another server associated with an administrator.

An event 206 associated with a change in the network 201 is obtained by an AP 120. The event 206 may affect configuration of one or more of the wireless beacon devices 110. For example, the event 206 may be one or more of: a wireless beacon device entering the network 201; a wireless beacon device moving from a first zone of the network 201 to a second zone of the network 201; a wireless beacon device removed from the network 201; a battery power level of a wireless beacon device being lower than a predetermined threshold; a new user policy indicating how data from the one or more wireless beacon devices is to be used by a network user being implemented, etc. Any other event that would affect the configuration of the configuration of one or more of the wireless beacon devices 110 is contemplated by the techniques presented herein.

At 207A and 207B, the AP 120 forwards the event 206 through the intermediate hop devices 180 to the management server 160. After detecting the event 206 from the AP 120, at 208 the management server 160 determines whether the event 206 matches the event policy 204. If the event 206 matches the event policy 204 (Yes at 208), at 210 the management server 160 selects one or more of the wireless beacons 110 in response to the detection of the event. At 212, the management server 160 generates programming information for configuring the one or more wireless beacon devices selected at 210. At 216, the management server 160 then forwards the programming information 214 via one or more wireless APs 120 to the one or more wireless beacon devices 110 for configuring the one or more wireless beacon devices 110 based on the programming information 214. At 218, the one or more wireless beacon devices 110 are configured based on the programming information 214.

For example, when a wireless beacon device enters a particular geographical zone, and this event matches the event policy 204, the management server 160 may detect the location of the wireless beacon device based on the broadcasts of the wireless beacon device using a received signal strength indicator (RSSI) or angle of arrival (AoA) signal obtained by the AP 120. The management server 160 then establishes a LE Secure point-to-point connection with the wireless beacon device and enforces the event policy 204 on the wireless beacon device or an aggregate of multiple beacon devices.

In some embodiments, the management server 160 may detect that there are more wireless beacon devices 110 deployed in a zone than it is required for implementing a user policy. The management server 160 may configure the wireless beacon devices to divide them into primary beacon devices and redundant beacon devices. The management server 160 causes the redundant beacon devices to stop chirping, pushing them into a secondary role, while causing the primary beacon devices to chirp. When the management server 160 detects an event that the primary beacon devices in the zone have exhausted their battery power (e.g., the battery power dropping below a predetermined threshold), the management server 160 promotes the redundant beacon devices into a primary role to replace the functions performed by the primary beacon devices.

In some embodiments, the management server 160 may detect an event indicating that one or more wireless beacon devices 110 in a zone do not conform to the event policy 204. When this occurs, the management server 160 can identify those wireless beacon devices that are not in conformity with the event policy 204, and flag them to the system administrator, e.g., by generating an alert for the administrator. For example, if a beacon device is found to be in policy violation or in violation of its intended capabilities, the management server 160 can generate an alert and/or disable the beacon device.

In some embodiments, an event policy can apply to any logical grouping of physical entities. For example, a policy may apply to a specific class of assets such as refrigerators or oxygen pumps. The association of wireless beacon devices to the asset may be performed in an asset management application or inferred based on the proximity between the wireless beacon devices and the asset.

Figure 3:
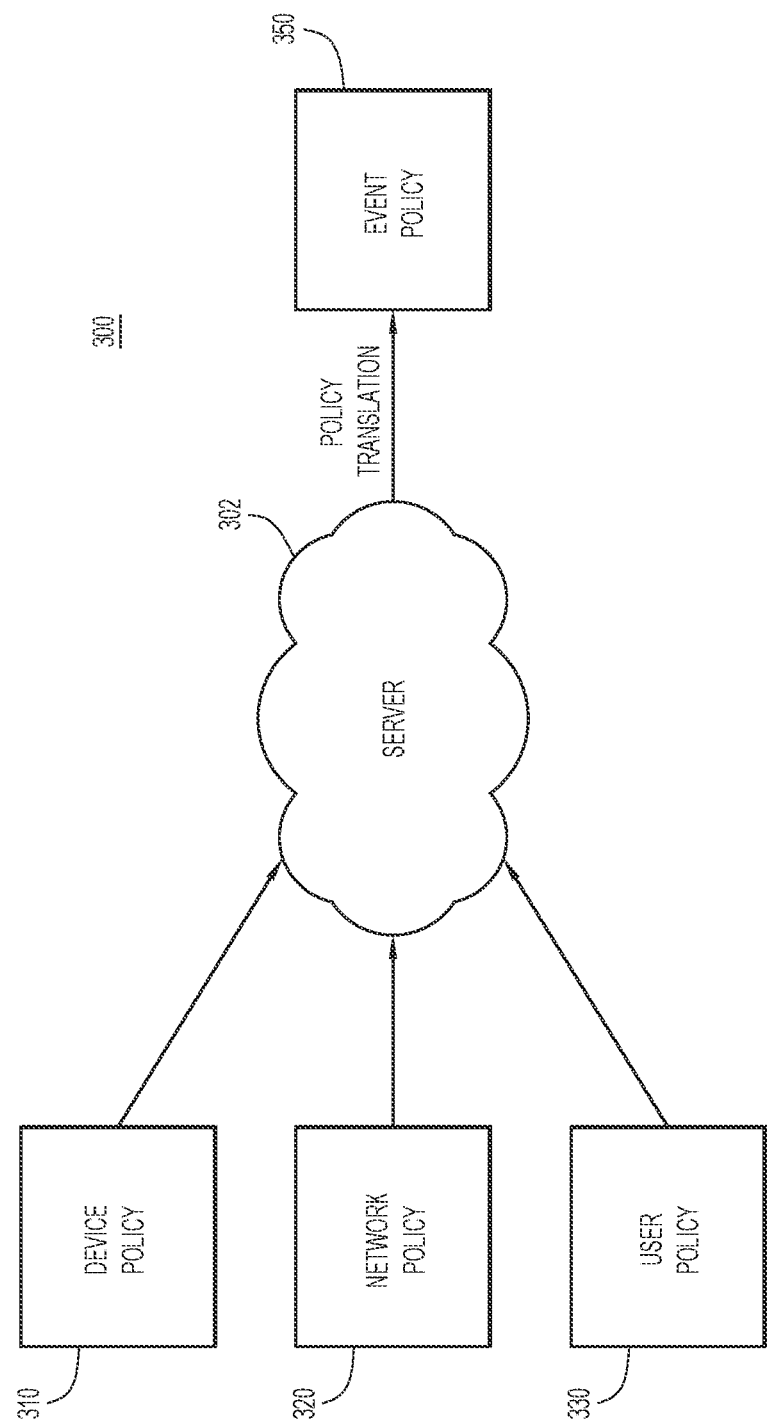
FIG. 3 shows a diagram depicting a process to generate an event policy for controlling one or more wireless beacon devices in a network, according to an example embodiment.

In some embodiments, an event policy may be generated based on multiple factors. Reference is now made to FIG. 3. FIG. 3 shows a process 300 to generate an event policy, according to an example embodiment. The management server 160 generates one or more event policies based on inputs from a wireless beacon device manufacturer, a network administrator, and/or a user of wireless beacon devices. For example, the management server 160 obtains a device policy 310 indicating device capabilities of one or more wireless beacon devices. When a beacon device is manufactured, the beacon device manufacturer may send the device capabilities of the beacon device to the management server 160. An example list of capabilities of a beacon device may take the form of:

```
{
"macaddress":"98*",
"vendor: "vendor A",
"devicetype": "beacon",
"broadcastformat": {
"ibeacon": true,
"eddystone": true,
"altbeacon": false
},
"meshcapable": false,
"telemetrycapable": false,
"batterybanks": 2
}
```

The list includes a MAC address for the beacon device ("98*"), a manufacturer's identifier ("vendor A"), and a device type ("beacon"). The list further indicates the supported beacon broadcast format (ibeacon and eddystone) and non-supported beacon broadcast format (altbeacon). The list also indicates that the beacon is not capable of transmitting sensor telemetry and is not capable of forming a mesh with other Bluetooth devices. Finally, the capabilities list shows that the beacon has two battery banks. In some embodiments, the management server 160 may obtain a device policy when the management server 160 is onboarding a beacon device. For example, when a user places a beacon device in the network managed by the management server 160, the beacon device may broadcast its device capabilities to the management server 160.

The management server 302 may also obtain a network policy 320 indicating network operation parameters for a network in which the wireless beacon devices are to be deployed. For example, the network operation parameters may indicate the resources and limitations set by a network administrator for the network.

In some embodiments, the management server 160 may also obtain a user policy 330 indicating how the one or more wireless beacon devices is to be used by a network user. An example high-level user policy may take the form:

```
{
"deviceType": "beacon",
"vendor": "vendor A",
"policyType": "policy A",
"zoneId": "zone A",
"macaddress": "98:*",
"profileType": "IBEACON",
"uuid": "e1cdf486-5ccf-11e8-9c2d-fa7ae01bbebc",
"major" : 5,
"minor": 5,
"eddystoneuid": null,
"eddystonenamespace": null,
"eddystoneurl": null,
"firmware": "3.x",
"powersavemode": true,
"highavailability": true,
"encrypttelemetry": true,
"empty": false
}
```

The above user policy indicates that all beacons whose MAC addresses begin with "98", made by vendor A and being in zone A should broadcast an iBeacon™ profile type with a QUID: e1cdf486-5ccf-11e8-9c2dfa7ae01bbebc. The major and minor fields show "5." The beacon(s) should run a firmware of a version between 3 and 4, and should run in a power saving mode and be highly available. If broadcasting telemetry data, the beacon(s) should encrypt the data. If there are no beacons in the zone to achieve the user policy, the management server 160 raises an alarm or alert to a network administrator.

After the management server 160 obtains the device policy 310, the network policy 320, and the user policy 330, the management server 160 performs a policy translation to generate an event policy 350. The management server 160 may maintain and update the event policy 350 when new device, network, and/or user policies are obtained. When the event policy is updated, the management server 160 may generate new programming information based on the updated event policy. The management server 160 may then forward the new programming information to associated APs for configuring one or more wireless beacon devices that are affected by the updated event policy.

Figure 4A:
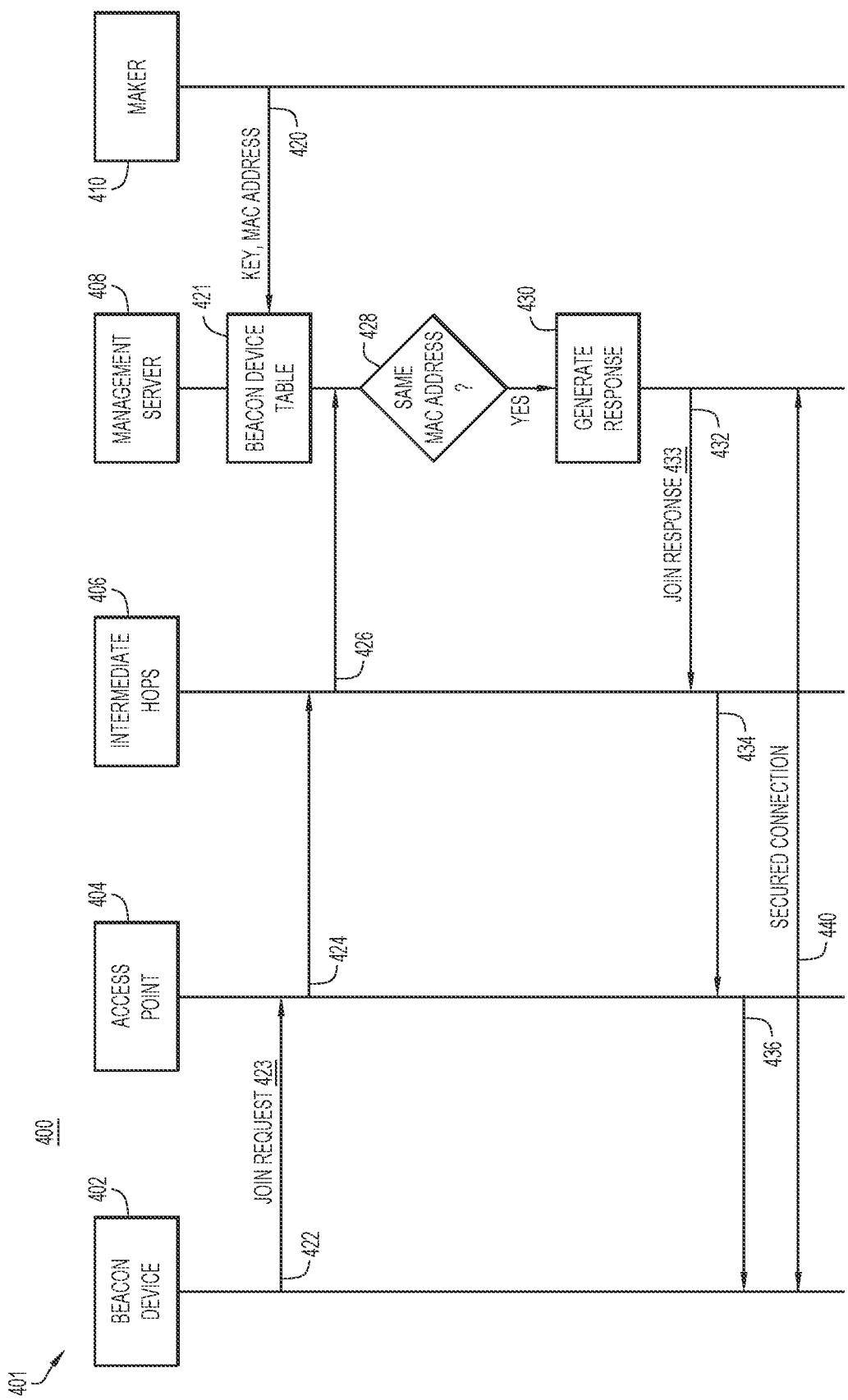
FIG. 4A illustrates a sequence diagram of a process for establishing a secured connection between a wireless beacon device and a management server in a system, according to an example embodiment.

Reference is made to FIG. 4A. FIG. 4A illustrates a process 400 for establishing a secured connection between a wireless beacon device and a management server in a system 401, according to an example embodiment. The system includes a wireless beacon device 402, an access point 404, one or more intermediate hops 406, a management server 408, and beacon maker 410 (e.g., a device associated with a manufacturer of the wireless beacon device 402). At 420, the beacon maker 410 transmits to the management server 408 a key and a MAC address for a wireless beacon device. When a beacon device is manufactured, the beacon manufacturer programs a connection key into the beacon device. The beacon manufacturer/vendor then transmits to the management server 408 the connection key that has been programmed into the beacon device, associated with a corresponding MAC address of the beacon device. The management server 408 stores the connection key and the MAC address in a beacon device table 421 for onboarding the beacon device.

When a customer deploys a beacon device 402 at a location, at 422 the beacon device 402, when turned on, broadcasts an unencrypted advertisement (Connection Request 423), which when received and decoded, provides to access point 404 the MAC address of the beacon device 402. As shown at 424 and 426, the access point 404 that receives the connection request advertisement 423 forwards it via one or more intermediate hop devices 406 to the management server 408.

When the management server 408 obtains the beacon device MAC address from the connection request advertisement 423, at 428 the management server 408 determines whether the MAC address of the beacon device 402 matches any MAC address previously stored by the management server 408 in the beacon device table 421. For example, assuming that the MAC address of the beacon device 402 matches the MAC address sent by the beacon maker 410 at 420, and at 430 the management server 408 uses the connection key obtained at 420 to generate a response for establishing a secured connection with the wireless beacon device 402.

At 432, the management server 408 forwards the connection response 433 towards the beacon device 402. As shown at 434 and 436, the connection response is forwarded to the beacon device 402 via one or more intermediate hop devices 406 and the access point 404. At 440, the beacon device 402 establishes secured connection with the management server 408 based on the connection response. In some embodiments, establishing the secured connection involves a three-way handshake mechanism and rotation of the connection key with a second key. The second key is used to establish an LE Secure point-to-point channel between the beacon device 402 and the management server 408 so as to securely configuring the beacon device 402.

FIG. 4B is a flow chart illustrating a method 450 performed by a management server to establish a secured connection with one or more wireless beacon devices, according to one example embodiment. For example, the method 450 can be performed by a management server, such as the management server 160 in FIGS. 1 and 2, and the management server 408 shown in FIG. 4A. At 452, the management server obtains a first key and a first MAC address of a first wireless beacon device. As shown in 420 in FIG. 4A, the management server may receive a key and a MAC address of a wireless beacon device from a beacon maker that programs the key in the beacon device. At 454, the management server obtains a connection request from a second wireless beacon device. The second wireless beacon device is in communication with a wireless access point and sends the connection request via the wireless access point. In some embodiments, the connection request at least includes a second MAC address of the second wireless beacon device.

At 456, the management server determines whether the second MAC address is the same as the first MAC address. After the management server obtains the second MAC address from the connection request, the management server may compare the second MAC address against a beacon device table (e.g., beacon device table 421 in FIG. 4A) to determine if the second MAC address matches any MAC address previously stored in the beacon device table. If the second MAC address is not the same as the first MAC address, e.g., no match is found (No at 456), at 458 the management server denies the connection request. The management server may generate and send a deny-connection response back to the second wireless beacon device. In some embodiments, the deny-connection response may include an error message indicating the reason for denying the connection request. If the second MAC address is the same as the first MAC address (Yes at 456), at 460 the management server uses the first key to generate a response for establishing a secured connection with the second wireless beacon device.

Figure 5:
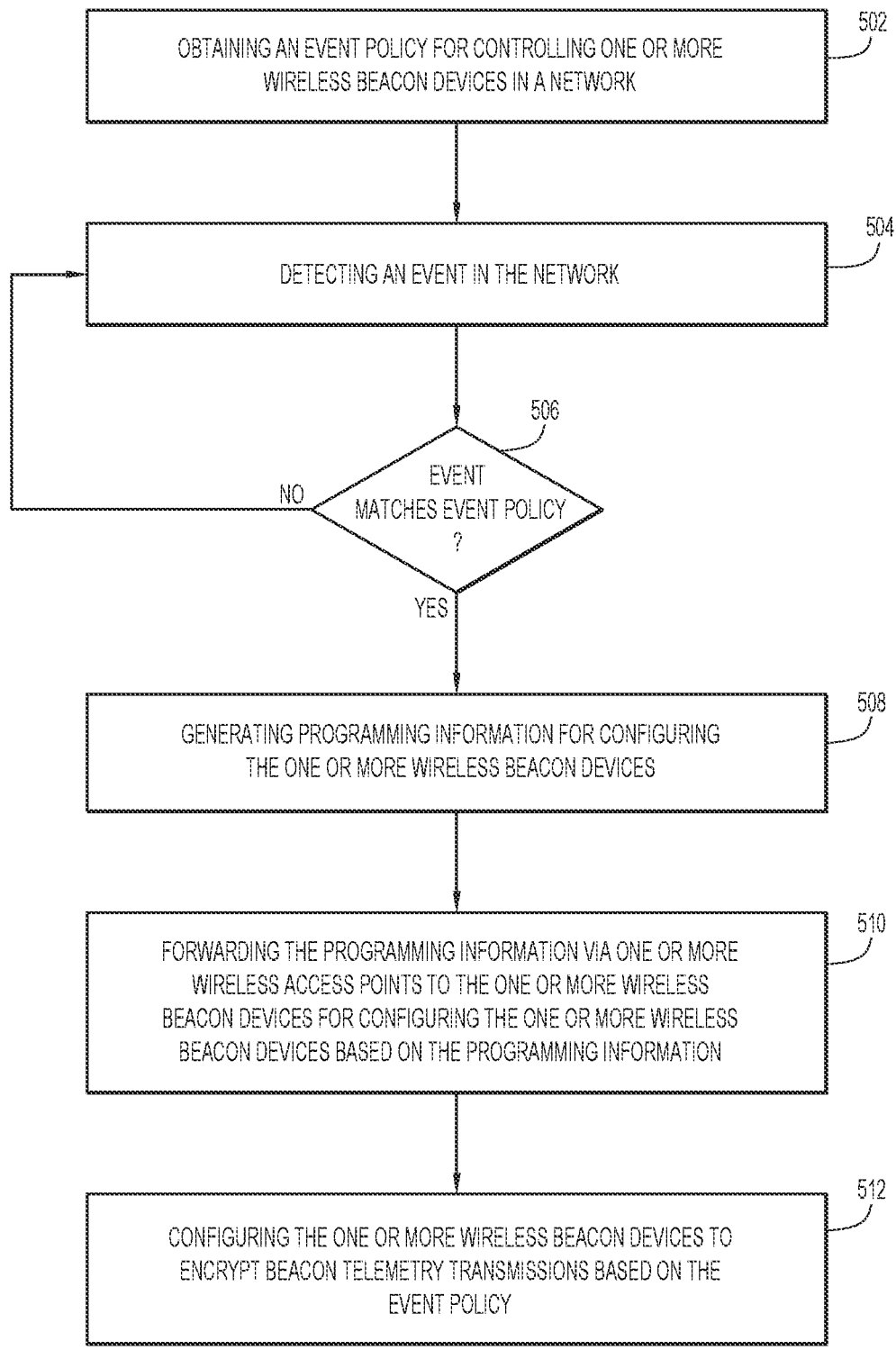
FIG. 5 is a flow chart illustrating a method for dynamically configuring one or more wireless beacon devices based on an event policy, according to an example embodiment.

Once a management server establishes a secured connection with a wireless beacon device, the management server may dynamically configure the wireless beacon device based on policies. FIG. 5 is a flow chart illustrating a method 500 for dynamically configuring one or more wireless beacon devices based on an event policy, according to one example embodiment. For example, the method 500 can be performed by a management server, such as the management server 160 in FIGS. 1 and 2. At 502, the management server obtains an event policy for controlling and configuring one or more wireless beacon devices in a network. In some embodiments, the management server first obtains various policies including a device policy indicating device capabilities of the one or more wireless beacon devices, a network policy indicating network operation parameters for the network, and/or a user policy indicating how the one or more wireless beacon devices is to be used by a network user. The management server then generates an event policy based on the device policy, the network policy, and the user policy. In some embodiments, the management server may obtain the event policy from a policy server that generates the event policy.

At 504, the management server detects an event in the network. For example, the management server may detect an event in which a wireless beacon device enters the network; a wireless beacon device moves from a first zone of the network to a second zone of the network; a wireless beacon device is remove from the network; a battery power level of a wireless beacon device is lower than a predetermined threshold; and a new user policy to be implemented is received by the management server.

At 506, the management server determines whether the event matches the event policy. For example, an event policy may indicate that a user is in need of five wireless beacon devices deployed in a geographical zone. When a wireless beacon devices is placed in the zone, the management server detects its existence in the zone and determines that the wireless beacon devices matches the event policy. In some embodiments, an event policy may indicate that wireless beacon devices deployed in a geographical zone should have battery power greater than a predetermined threshold. When the management server detects that the battery power of a wireless beacon device deployed in the zone drops to less than the predetermined threshold, the management server may determine that the event matches the event policy and warrant a further action.

If the event does not match the event policy (No at 506), the management server waits for another event to occur in the network. If the event matches the event policy (Yes at 506), at 508 the management server generates programming information for configuring the one or more wireless beacon devices. In some embodiments, the management server may first select one or more wireless beacon devices that satisfy the event policy to be configured and generate programming information for the selected one or more wireless beacon devices. At 510, the management server forwards the programming information via one or more wireless access points to the one or more wireless beacon devices for configuring the one or more wireless beacon devices based on the programming information.

In some embodiments, the management server may need telemetry data from the one or more wireless beacon devices. Thus, at 512, the management server configures the one or more wireless beacon devices to encrypt beacon telemetry transmissions based on the event policy.

Figure 6:
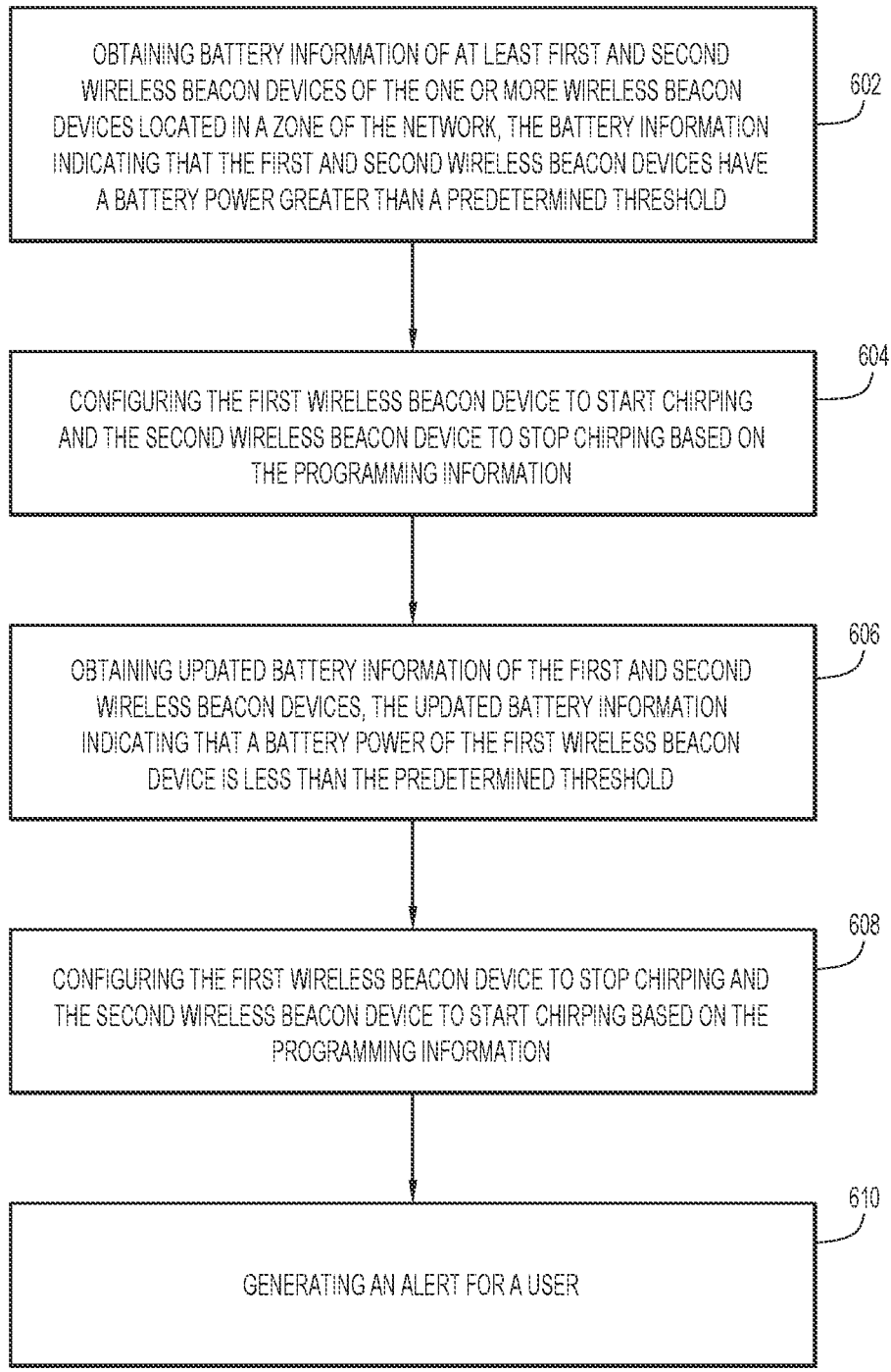
FIG. 6 is a flow chart illustrating a method for dynamically configuring one or more wireless beacon devices based on battery power of the one or more wireless beacon devices, according to an example embodiment.

As wireless beacon devices are generally powered by battery, a power policy may be implemented to control the wireless beacon devices. For example, when the battery power of a wireless beacon device has been dropped to lower than a predetermined threshold defined by a power policy, this may indicate that the wireless beacon device may not be able to continue the functions it provides (e.g., chirping). FIG. 6 is a flow chart illustrating a method 600 for dynamically configuring one or more wireless beacon devices based on battery power of one or more wireless beacon devices, according to one example embodiment. For example, the method 600 can be performed by a management server, such as the management server 160 in FIGS. 1 and 2. At 602, the management server obtains battery information of at least first and second wireless beacon devices of the one or more wireless beacon devices located in a zone of the network. The battery information indicates that the first and second wireless beacon devices both have a battery power greater than a predetermined threshold. For example, the wireless beacon devices may transmit their battery power information to the management server as part of telemetry data reports to the management server.

At 604, the management server configures the first wireless beacon device to start chirping and the second wireless beacon device to stop chirping based on programming information. For example, an event policy maintained by the management server may indicates that a zone needs one beacon device having a battery power greater than a predetermined threshold to perform chirping. When the management server detects that two wireless beacon devices are deployed at the zone and both have a battery power greater than the predetermined threshold, the management server may make one of the wireless beacon devices remain dormant to save its power. The management server generates, in response to obtaining the battery information, programming information to configure the first wireless beacon device to start chirping and the second wireless beacon device to stop chirping.

At 606, the management server obtains updated battery information of the first and second wireless beacon devices, where the updated battery information indicates that a battery power of the first wireless beacon device is less than the predetermined threshold. At 608, the management server configures the first wireless beacon device to stop chirping and the second wireless beacon device to start chirping based on the programming information. Thus, when the first wireless beacon device runs out of power, the management server can dynamically configure the second wireless beacon device to take over the functions performed by the first wireless beacon device so that the services provided by the first beacon device can be continued. These techniques are automatically performed by the management server without manual intervention. In some embodiments, once the management server has reconfigured the first wireless beacon device to stop chirping, the management server can generate an alert (610) for a user (e.g., network administrator) such that the user may take an appropriate action, e.g., recharging or replacing the battery of the first wireless beacon device.

Figure 7:
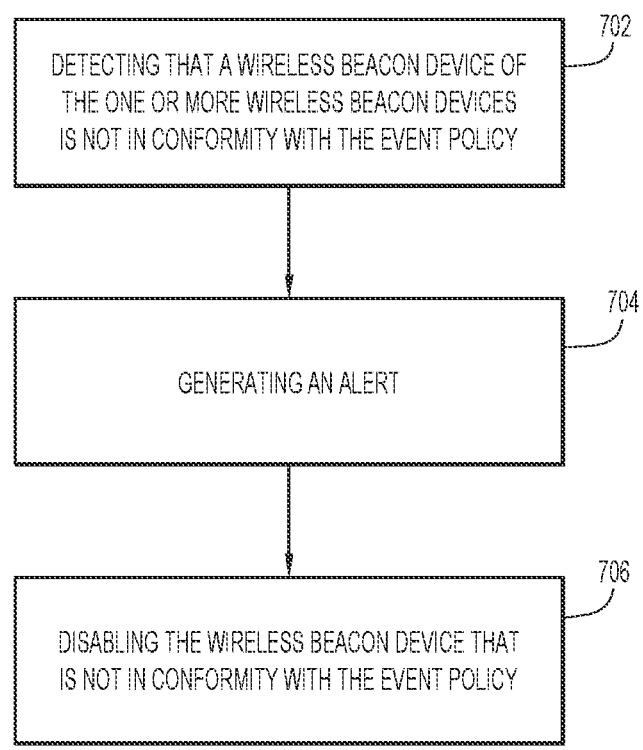
FIG. 7 is a flow chart illustrating a method for identifying one or more wireless beacon devices that do not conform to an event policy, according to an example embodiment.

Techniques disclosed herein also automatically identify rogue wireless beacon devices in the network to reduce security threats or policy violations. FIG. 7 is a flow chart illustrating a method 700 for identifying one or more wireless beacon devices that do not conform to an event policy, according to one example embodiment. For example, the method 700 can be performed by a management server, such as the management server 160 in FIGS. 1 and 2. At 702, the management server detects that a wireless beacon device is not in conformity with the event policy. For example, as described above in connection with FIG. 6, the management server detects that a battery power of a wireless beacon device is less than a predetermined threshold of an event policy, and can determine that the wireless beacon device is not in conformity with the event policy. In one embodiment, an event policy may require a particular wireless beacon device to be deployed within a particular zone. When the management server detects the particular wireless beacon device has been moved to outside of the particular zone, the management server can determine that the particular wireless beacon device is not in conformity with the event policy. In one embodiment, an event policy may require all wireless beacon devices deployed in a particular zone to perform a particular function. When the management server detects that a wireless beacon device is performing a different function (e.g., displaying a different message than required), the management server can determine that the particular wireless beacon device is not in conformity with the event policy.

At 704, the management server generates an alert for a user (e.g., a network administrator) of the one or more wireless beacon devices. The alert may help the user to take some manual measure to correct the inconformity. For example, a wireless beacon device may have been inadvertently relocated to a different zone from its intended location. Based on the alert, the user may retrieve the wireless beacon device and place it in the intended location.

In some embodiments, when the management server detects that a wireless beacon device is not in conformity with the event policy, the management server may disable the wireless beacon device that is not in conformity with the event policy (706). For example, the management server may reconfigure the wireless beacon device so that the wireless beacon device stops performing an intended function.

The techniques disclosed herein can automatically configure wireless beacon devices based on a policy with reduced manual intervention. In some embodiments, instead of programming an individual beacon or tag, the techniques allow a network administrator to program and enforce policies on a logical entity basis, such as a geographic zone or a collection of zones, or a collection of similar assets (e.g., printers, refrigerators, pumps, etc.), which are associated with the beacon or the tag. When the beacon or the tag becomes associated with the logical entity by virtue of its location or by virtue of explicit association, the beacon or tag is configured based on the policies associated with the logical entity and adjusts its behavior accordingly.

In some embodiments, the wireless beacon/tag devices consistent with the disclosed techniques seamlessly communicate to a management server for location, telemetry and management solutions via one or more access points using the Bluetooth protocol. The packet formats may abide by a standard BLE SIG Generic Access Profile (GAP) advertisement for broadcasts and use BLE SIG GATT (Generic Attributes) LE Secure channels for point-to-point connections.

The techniques applies to any wireless beacon systems irrespective of whether multiple vendors (beacon device manufacturers) are in the same space or whether a single vendor has multiple models or a single model of beacons. The techniques employ a management server to manage a set of beacons which a user wants to use to deliver an outcome. The techniques may abstract an overlay network and allow the manufacturer and user intent/policy to control wireless beacons/tags. As these techniques apply to logical entities, the techniques are useful in a virtual or augmented reality deployments. For example, a policy may define that if anybody finds a "Pikachu" Pokémon in a premise, display the message "Well done." In this example, the beacons are undefined and the location is undefined. However, the management server understands the intent, and when the event happens, the policy can be applied to produce the desired outcome.

Figure 8:
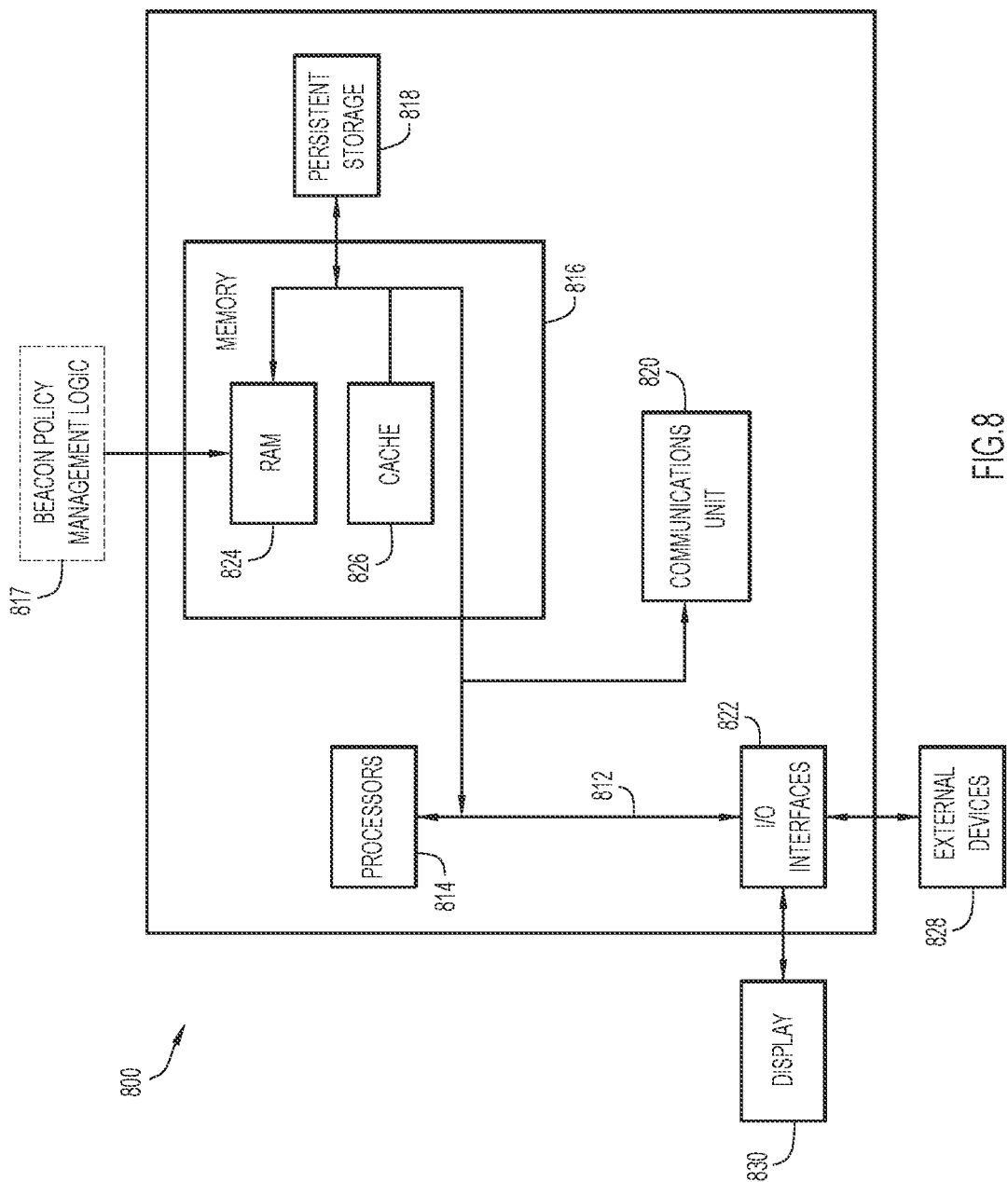
FIG. 8 is a block diagram of a management server configured to control one or more wireless beacon devices, according to an example embodiment.

FIG. 8 illustrates a hardware block diagram of a computing device 800 that may serve as the management server 160 described herein. It should be appreciated that FIG. 8 provides only an illustration of one embodiment and does not imply any limitations with regard to the environments in which different embodiments may be implemented. Many modifications to the depicted environment may be made.

As depicted, the device 800 includes a bus 812, which provides communications between computer processor(s) 814, memory 816, persistent storage 818, communications unit 820, and input/output (I/O) interface(s) 822. Bus 812 can be implemented with any architecture designed for passing data and/or control information between processors (such as microprocessors, communications and network processors, etc.), system memory, peripheral devices, and any other hardware components within a system. For example, bus 812 can be implemented with one or more buses.

Memory 816 and persistent storage 818 are computer readable storage media. In the depicted embodiment, memory 816 includes random access memory (RAM) 824 and cache memory 826. In general, memory 816 can include any suitable volatile or non-volatile computer readable storage media.

One or more programs may be stored in persistent storage 818 for execution by one or more of the respective computer processors 814 via one or more memories of memory 816. The persistent storage 818 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information. For example, the one or more programs may include software instructions for beacon policy management logic 817, that, when executed by the one or more processors 814, cause the computing device 800 to perform the operations of the management server 160 described herein in connection with the accompanying figures. In addition, the memory 816 stores the aforementioned information that the management server 160 uses to management the beacon network, such as key-tables, battery power state of beacon devices (updated over time), authorized beacon devices, authorized APs and other intermediate hop devices, etc.

The media used by persistent storage 818 may also be removable. For example, a removable hard drive may be used for persistent storage 818. Other examples include optical and magnetic disks, thumb drives, and smart cards that are inserted into a drive for transfer onto another computer readable storage medium that is also part of persistent storage 818.

Communications unit 820, in these examples, provides for communications with other data processing systems or devices. In these examples, communications unit 820 includes one or more network interface cards. Communications unit 820 may provide communications through the use of either or both physical and wireless communications links.

I/O interface(s) 822 allows for input and output of data with other devices that may be connected to computer device 800. For example, I/O interface 822 may provide a connection to external devices 828 such as a keyboard, keypad, a touch screen, and/or some other suitable input device. External devices 828 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 822. I/O interface(s) 822 may also connect to a display 830. Display 830 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one aspect, a method is provided. The method includes: generating, at a server, an event policy for controlling one or more wireless beacon devices in a network; detecting an event in the network; determining whether the event matches the event policy; when the event matches the event policy, generating programming information for configuring the one or more wireless beacon devices; and forwarding the programming information via one or more wireless access points to the one or more wireless beacon devices for configuring the one or more wireless beacon devices based on the programming information.

In another aspect, an apparatus is provided. The apparatus includes a network interface that enables network communications, a processor, and a memory to store data and instructions executable by the processor. The processor is configured to execute the instructions to: generate an event policy for controlling one or more wireless beacon devices in a network; detect an event in the network; determine whether the event matches the event policy; when the event matches the event policy, generate programming information for configuring the one or more wireless beacon devices; and forward the programming information via one or more wireless access points to the one or more wireless beacon devices for configuring the one or more wireless beacon devices based on the programming information.

In yet another aspect, one or more non-transitory computer-readable storage media are provided. The one or more non-transitory computer-readable storage media are encoded with software comprising computer executable instructions which, when executed by a processor, cause the processor to: generate an event policy for controlling one or more wireless beacon devices in a network; detect an event in the network; determine whether the event matches the event policy; when the event matches the event policy, generate programming information for configuring the one or more wireless beacon devices; and forward the programming information via one or more wireless access points to the one or more wireless beacon devices for configuring the one or more wireless beacon devices based on the programming information.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A method comprising:
   obtaining a network policy indicating network operation parameters for a network;
   generating, at a server, an event policy for controlling one or more wireless beacon devices in the network based on the network policy and capabilities of the one or more wireless beacon devices;
   detecting an event in the network, the event relating to one or more of a change of a location or a battery power level of a wireless beacon device of the one or more wireless beacon devices;
   determining whether the event matches the event policy;
   when the event matches the event policy, generating programming information for configuring the one or more wireless beacon devices, the programming information indicating one or more functions to be performed by the one or more wireless beacon devices; and
   forwarding the programming information via one or more wireless access points to the one or more wireless beacon devices for configuring the one or more wireless beacon devices based on the programming information.

2. The method of claim 1, wherein detecting the event includes detecting one or more of: the wireless beacon device entering the network; the wireless beacon device moving from a first zone of the network to a second zone of the network; the wireless beacon device removed from the network; and the battery power level of the wireless beacon device being less than a predetermined threshold.

3. The method of claim 1, further comprising:
obtaining a first key and a first media access control address of a first wireless beacon device of the one or more wireless beacon devices;
obtaining a connection request from a second wireless beacon device of the one or more wireless beacon devices, the second wireless beacon device being in communication with one of the one or more wireless access points, the connection request including a second media access control address of the second wireless beacon device; and
in response to determining that the second media access control address is same as the first media access control address, using the first key to generate a response for establishing a secured connection with the second wireless beacon device.

4. The method of claim 1, further comprising:
obtaining battery information of at least first and second wireless beacon devices of the one or more wireless beacon devices located in a zone of the network, the battery information indicating that the first and second wireless beacon devices have a battery power greater than a predetermined threshold;
configuring the first wireless beacon device to start chirping and the second wireless beacon device to stop chirping based on the programming information;
obtaining updated battery information of the first and second wireless beacon devices, the updated battery information indicating that a battery power of the first wireless beacon device is less than the predetermined threshold; and
configuring the first wireless beacon device to stop chirping and the second wireless beacon device to start chirping based on the programming information.

5. The method of claim 1, further comprising:
detecting that the wireless beacon device of the one or more wireless beacon devices is not in conformity with the event policy; and
in response to the detecting, generating an alert.

6. The method of claim 5, further comprising:
disabling the wireless beacon device that is not in conformity with the event policy.

7. The method of claim 1, further comprising:
configuring the one or more wireless beacon devices to encrypt beacon telemetry transmissions based on the event policy.

8. The method of claim 1, further comprising:
obtaining a user policy indicating how data from the one or more wireless beacon devices is to be used by a network user; and
generating the event policy further based on the user policy.

9. The method of claim 1, wherein generating the event policy for controlling the one or more wireless beacon devices is further based on information about supported beacon broadcast format and non-supported beacon broadcast format by the one or more wireless beacon devices and wherein generating the programming information for configuring the one or more wireless beacon devices includes generating the programming information based on a broadcast to be made determined by the information about the supported beacon broadcast format and the non-supported beacon broadcast format.

10. The method of claim 1, further comprising:
configuring one of the one or more wireless beacon devices to start chirping and another one of the one or more wireless beacon devices to stop chirping, based on the programming information.

11. An apparatus comprising:
a network interface that enables network communications;
a processor; and
a memory to store data and instructions executable by the processor,
wherein the processor is configured to execute the instructions to:
obtain a network policy indicating network operation parameters for a network;
generate an event policy for controlling one or more wireless beacon devices in the network based on the network policy and capabilities of the one or more wireless beacon devices;
detect an event in the network;
determine whether the event matches the event policy, the event relating to one or more of a change of a location or a battery power level of a wireless beacon device of the one or more wireless beacon devices;
when the event matches the event policy, generate programming information for configuring the one or more wireless beacon devices, the programming information indicating one or more functions to be performed by the one or more wireless beacon devices; and
forward the programming information via one or more wireless access points to the one or more wireless beacon devices for configuring the one or more wireless beacon devices based on the programming information.

12. The apparatus of claim 11, wherein the processor is configured to detect the event by detecting one or more of: the wireless beacon device entering the network; the wireless beacon device moving from a first zone of the network to a second zone of the network; the wireless beacon device removed from the network; and the battery power level of the wireless beacon device being less than a predetermined threshold.

13. The apparatus of claim 11, wherein the processor is configured to execute the instructions to:
obtain a first key and a first media access control address of a first wireless beacon device of the one or more wireless beacon devices;
obtain a connection request from a second wireless beacon device of the one or more wireless beacon devices, the second wireless beacon device being in communication with one of the one or more wireless access points, the connection request including a second media access control address of the second wireless beacon device; and
in response to determining that the second media access control address is same as the first media access control address, use the first key to generate a response for establishing a secured connection with the second wireless beacon device.

14. The apparatus of claim 11, wherein the processor is configured to execute the instructions to:
obtain battery information of at least first and second wireless beacon devices of the one or more wireless beacon devices located in a zone of the network, the battery information indicating that the first and second wireless beacon devices have a battery power greater than a predetermined threshold;

configure the first wireless beacon device to start chirping and the second wireless beacon device to stop chirping based on the programming information;

obtain updated battery information of the first and second wireless beacon devices, the updated battery information indicating that a battery power of the first wireless beacon device is less than the predetermined threshold; and configure the first wireless beacon device to stop chirping and the second wireless beacon device to start chirping based on the programming information.

15. The apparatus of claim 11, wherein the processor is configured to execute the instructions to:

configure the one or more wireless beacon devices to encrypt beacon telemetry transmissions based on an encryption field defined in the event policy.

16. One or more non-transitory computer-readable storage media encoded with software comprising computer executable instructions which, when executed by a processor, cause the processor to perform operations comprising:

obtaining a network policy indicating network operation parameters for a network;

generating an event policy for controlling one or more wireless beacon devices in the network based on the network policy and capabilities of the one or more wireless beacon devices;

detecting an event in the network, the event relating to one or more of a change of a location or a battery power level of a wireless beacon device of the one or more wireless beacon devices;

determining whether the event matches the event policy;

when the event matches the event policy, generating programming information for configuring the one or more wireless beacon devices, the programming information indicating one or more functions to be performed by the one or more wireless beacon devices; and forwarding the programming information via one or more wireless access points to the one or more wireless beacon devices for configuring the one or more wireless beacon devices based on the programming information.

17. The one or more non-transitory computer-readable storage media of claim 16, wherein the instructions cause the processor to perform the operation of detecting the event by detecting one or more of: the wireless beacon device entering the network; the wireless beacon device moving from a first zone of the network to a second zone of the network; the wireless beacon device removed from the network; and the battery power level of the wireless beacon device being less than a predetermined threshold.

18. The one or more non-transitory computer-readable storage media of claim 16, wherein the instructions further cause the processor to perform additional operations comprising:

obtaining a first key and a first media access control address of a first wireless beacon device of the one or more wireless beacon devices;

obtaining a connection request from a second wireless beacon device of the one or more wireless beacon devices, the second wireless beacon device being in communication with one of the one or more wireless access points, the connection request including a second media access control address of the second wireless beacon device; and in response to determining that the second media access control address is same as the first media access control address, using the first key to generate a response for establishing a secured connection with the second wireless beacon device.

19. The one or more non-transitory computer-readable storage media of claim 16, the instructions further cause the processor to perform additional operations comprising:

obtaining battery information of at least first and second wireless beacon devices of the one or more wireless beacon devices located in a zone of the network, the battery information indicating that the first and second wireless beacon devices have a battery power greater than a predetermined threshold;

configuring the first wireless beacon device to start chirping and the second wireless beacon device to stop chirping based on the programming information;

obtaining updated battery information of the first and second wireless beacon devices, the updated battery information indicating that a battery power of the first wireless beacon device is less than the predetermined threshold; and configuring the first wireless beacon device to stop chirping and the second wireless beacon device to start chirping based on the programming information.

20. The one or more non-transitory computer-readable storage media of claim 16, wherein the instructions further cause the processor to perform additional operations comprising:

detecting that the wireless beacon device of the one or more wireless beacon devices is not in conformity with the event policy; and in response to detecting that one of the one or more wireless beacon devices is not in conformity with the event policy, generating an alert or disabling the wireless beacon device that is not in conformity with the event policy.

* * * * *